United States Patent [19]

James et al.

[11] 4,169,215

[45] Sep. 25, 1979

[54] SIGNAL LIMITING CIRCUIT

[75] Inventors: Dennis B. James, Rumson, N.J.; John F. O'Neill, Boulder, Colo.

[73] Assignee: Bell Telephone Laboratories, Incorporated, Murray Hill, N.J.

[21] Appl. No.: 933,190

[22] Filed: Aug. 14, 1978

[51] Int. Cl.$^2$ ............................................ H04B 3/22
[52] U.S. Cl. ............................ 179/16 F; 179/84 VF; 328/169
[58] Field of Search ............ 179/1 C, 2 C, 1 P, 1 MN, 179/18 FA, 81 R, 84 VF, 170.2, 170.6, 170.8, 184, 186, 170 C, 170 E, 16 F; 328/165, 169

[56] References Cited

U.S. PATENT DOCUMENTS

| | | | |
|---|---|---|---|
| 2,920,281 | 1/1960 | Appert et al. | 330/124 R |
| 3,374,435 | 3/1968 | Engel | 328/165 |
| 3,602,800 | 8/1971 | Feldman et al. | 179/1 C |
| 3,611,145 | 10/1971 | O'Connor | 179/1 P |
| 4,117,414 | 9/1978 | Lillig et al. | 328/165 |

OTHER PUBLICATIONS

P. R. Arthur, "Dynamic Noise Limiter," Radio and Electronics Constructor, vol. 30, No. 1, Aug. 1976, pp. 41–47 (179-1P).

"Dynamic Noise Limiter," Elektor, vol. 2, No. 3, Mar. 1976, pp. 341–346.

*Primary Examiner*—Kathleen H. Claffy
*Assistant Examiner*—Randall P. Myers
*Attorney, Agent, or Firm*—James M. Graziano

[57] ABSTRACT

The disclosed signal limiting circuit is bridged on to a bidirectional communication path (T, R) and functions to selectively attenuate excessive signals ($2V_A$) being transmitted in a predetermined direction on the bidirectional communication path. This is accomplished by a signal discriminator circuit (100) which separates the excessive signal ($2V_A$) from the plurality of signals appearing on the communication path (T, R). The signal discriminator circuit (100) also inverts the isolated excessive signal, passes it through an attenuator (102) to a signal injection circuit (103) which injects a controlled amount of the 180 degrees out-of-phase isolated excessive signal back on the communication path (T, R) to cancel out a portion of the excessive signal, thereby providing selective attenuation of the excessive signal.

7 Claims, 1 Drawing Figure

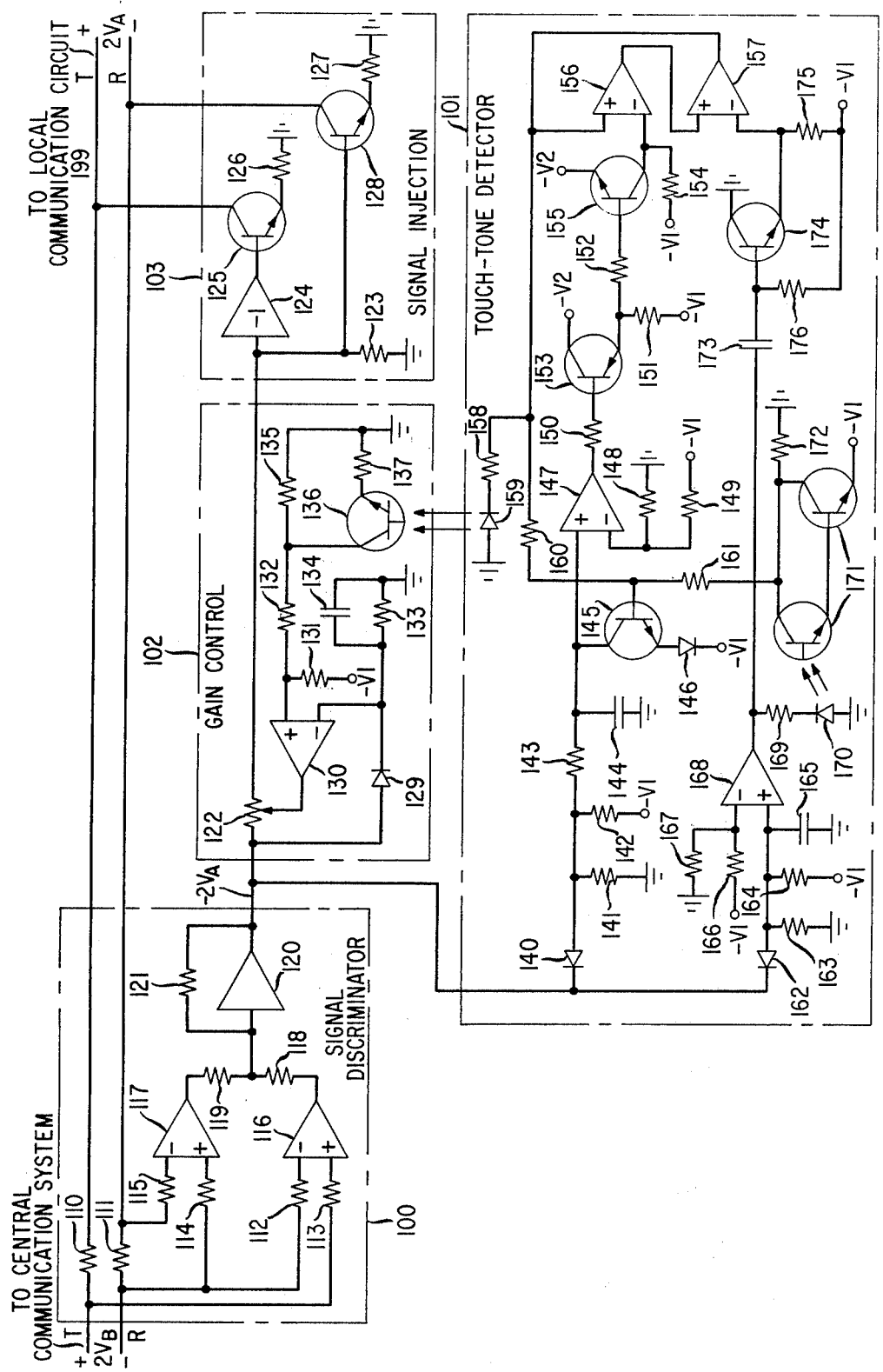

SIGNAL LIMITING CIRCUIT

TECHNICAL FIELD

This invention relates to signal limiting circuits and in particular to a control arrangement for selectively attenuating a single excessive signal out of a plurality of signals appearing on a bidirectional communication path.

BACKGROUND ART

There are numerous prior art signal limiting arrangements and these can be classified into a number of broad categories. One such category is that of breakdown devices, which are designed to protect the communication path from overvoltage conditions. These breakdown devices must pass voltage signals of one magnitude while blocking voltage signals of another magnitude. One such breakdown device is disclosed in U.S. Pat. application of Gordon, Mazurek and Wright, Ser. No. 764,594, filed Feb. 1, 1977, now U.S. Pat. No. 4,106,070, and is used to monitor the communication path for an overvoltage condition. Such a device is passive and only operates when such an overvoltage condition is detected. In that event, the device operates to open the communication path for the duration of the overvoltage condition. The difficulties encountered in utilizing such breakdown devices are: all signals on the communication path are blocked during the occurrence of the overvoltage condition; it is difficult to establish an accurate threshold level for triggering the breakdown device; and this form of signal limiting does not lend itself to limiting voice signals whose magnitude is small in relation to the ambient dc bias level appearing on the communication path.

A second category of signal limiting arrangements is that of signal attenuation circuits, which attenuate the signals appearing on the communication path when an overvoltage condition is detected. Essentially, this is a variation of the breakdown device category since, instead of opening the communication path when an excessive signal is detected, a variable impedance is employed to simply shunt the communication path. The difficulty with this arrangement is that while the excessive signal is attenuated, so are the weak signals also appearing on the communication path.

An alternative to the above-described passive signal limiting circuits is the active signal limiting arrangement disclosed in U.S. Pat. application of Angner, Egan, Gordon, and Huryn, Ser. No. 840,593, filed Oct. 11, 1977, now U.S. Pat. No. 4,145,579. The Angner et al signal limiting circuit employs a signal transformer which is physically constructed in a manner which allows the passage of voice frequency signals while preventing the passage of ringing and power frequency signals. The circuit is arranged to pass dial pulses and to shunt down the central office battery current in response to a detected high central office loop current condition which is indicative of a short loop. The difficulty with this arrangement is that all Touch-Tone network control signals are also attenuated.

Thus, prior art signal limiting arrangements operate somewhat indiscriminately, blocking or attenuating all signals, rather than exclusively controlling a particular excessive signal and passing all other signals unattenuated.

DISCLOSURE OF THE INVENTION

The foregoing problem is solved and a technical advance is achieved by the selective signal limiting circuit of our invention which is bridged onto the communication path between a local communication circuit and the central communication system. The selective signal limiting circuit of our invention functions to attenuate only excessive outgoing signals generated by the local communication circuit without suppressing the weak incoming signal from the central communication system. This is accomplished by connecting the input terminals of a pair of operational amplifiers across a pair of small resistors inserted in series with the communication path to obtain both the sum and the difference of the aforementioned incoming and outgoing signals which appear on the communication path. The sum and difference signals are then combined to cancel the weak incoming signal from the central communication system, thereby isolating the excessive outgoing signal generated by the local communication circuit. This resultant excessive signal is then applied to an automatic gain control (AGC) and cancellation circuit. The AGC and cancellation circuit injects a controlled amount of the isolated excessive signal back on the communication path 180 degrees out-of-phase with the original excessive outgoing signal to cancel out a portion of the excessive signal appearing thereon, thereby limiting the outgoing signal level. Since only the excessive signal is injected back onto the communication path in inverted form, the weak incoming signal from the central communication system is not attenuated by this arrangement. Touch-Tone detection and timing circuitry is also supplied to prevent the AGC action from suppressing Touch-Tone network control signals that may be present on the communication path.

BRIEF DESCRIPTION OF THE DRAWING

The operation and utilization of the present invention will be more fully apparent from the following description of the drawing in which:

FIG. 1 shows the preferred embodiment of the invention.

DETAILED DESCRIPTION

The FIGURE illustrates the signal limiting circuit of our invention, which circuit is interposed in series in the communication path, leads T and R, which extends from a communication circuit 199 to a central communication system (not shown). It is assumed that communication circuit 199 is producing an outgoing signal, identified as $2V_A$, which signal is of excessive magnitude. Additionally, it will be assumed that the central communication system is producing an incoming signal identified as $2V_B$, which signal is within the normal limits of allowable signal magnitudes. The disclosed signal limiting circuit functions to selectively cancel a portion of the excessive outgoing signal generated by communication circuit 199, thereby bringing the outgoing signal within the normal limits of allowable signal magnitudes.

To accomplish this, the signal limiting circuit of our invention contains a signal discriminator 100 connected in series with communication path T, R, and which functions to isolate the offensive excessive outgoing signal from the other signals appearing on communication path T, R. This isolated excessive outgoing signal is then applied to Touch-Tone detector 101 which determines if the excessive signal is a valid Touch-Tone network control signal. If a valid Touch-Tone network control signal is detected, Touch-Tone detector 101 disables gain control circuit 102 to prevent these network control signals from being erroneously attenuated. If the excessive signal is not a Touch-Tone network control signal, gain control circuit 102 operates to enable signal injection circuit 103 to inject a portion of the inverted excessive signal onto communication path T, R to thereby cancel a portion of the excessive outgoing signal appearing thereon. Thus, the disclosed signal limiting circuit isolates the excessive outgoing signal, inverts it and injects a portion of the isolated inverted signal back on to communication path T, R to selectively attenuate the excessive outgoing signal and bring it within the allowable signal magnitude limits, assuming that the source of $2V_A$ has a greater than zero source impedance.

SIGNAL DISCRIMINATOR 100

Signal discriminator 100 contains two small resistors 110, 111 inserted in series with communication path T, R to convert the signal currents appearing thereon to equivalent signal voltages. These signal voltages are then carried by resistors 113, 112, and 114, 115 to the positive and negative input terminals of operational amplifiers 116 and 117 respectively. These resistor-operational amplifier combinations are employed to isolate the excessive outgoing signal by obtaining both the sum and the difference of the incoming and outgoing signals and then combining these results to isolate the excessive outgoing signal. In particular, the output of operational amplifier 116 is voltage $(V_A+V_B)$, which is the sum of the two signal voltages, while the output of operational amplifier 117 is voltage $(V_A-V_B)$ which is the difference of the two signal voltages. These two output signals are summed by resistors 118 and 119, each of value R, to obtain voltage $2V_A$, which voltage is applied to the input terminal of inverter 120 which is equipped with feedback resistor 121 of value R to yield an output voltage of $-2V_A$. Thus, the resistor-operational amplifier combinations of signal discriminator 100 convert the two signal voltages appearing on communication path T, R to an output voltage of $-2V_A$ and, in doing so, thereby isolates the excessive outgoing signal of communication circuit 199 from the other signals appearing on communication path T, R.

GAIN CONTROL 102

Gain control 102 comprises a variable resistor 122 connected in series between signal discriminator 100 and signal injection circuit 103. Variable resistor 122 comprises a field effect transistor or other similar voltage controlled resistance device and is operated by a gain setting circuit which comprises the remaining circuitry (129-37) of gain control circuit 102. In particular, the excessive outgoing signal $-2V_A$ isolated by signal discriminator 100 is rectified by diode 129 and applied through a low-pass filter comprised of resistor 133 and capacitor 134 to the negative input terminal of operational amplifier 130. The positive input terminal of operational amplifier 130 is connected to a voltage reference comprising resistors 131, 132, 135, 137 and phototransistor 136. Operational amplifier 130 responds to the voltage difference between the rectified excessive signal voltage and the voltage reference to produce an output signal which controls variable resistor 122. As the signal voltage increases, the amount of series resistance inserted in the signal path is reduced to pass more of the signal to signal injection circuit 103. Thus, the magnitude of the isolated excessive outgoing signal $-2V_A$ establishes the amount of series resistance inserted between signal discriminator 100 and signal injection circuit 103, thereby controlling the amount of this isolated excessive outgoing signal applied to the input of signal injection circuit 103.

SIGNAL INJECTION CIRCUIT 103

Signal injection circuit 103 is comprised of inverter 124, resistors 123, 126, 127 transistors 125, 128 and functions to take the portion of the isolated excessive signal passed by variable resistor 122 and apply this signal to communication path T, R to thereby attenuate the excessive signal appearing thereon.

TOUCH-TONE DETECTOR 101

The above-described signal limiting circuit will function to attenuate all excessive signals generated by communication circuit 199 and appearing on communication path T, R. However, the signal limiting circuit also attenuates Touch-Tone network control signals generated by communication circuit 199. Therefore, Touch-Tone detector circuit 101 is added to prevent routine Touch-Tone network control signals from being erroneously attenuated.

Touch-Tone detector 101 functions by taking the signal output of signal discriminator 100, which is isolated excessive signal $-2V_A$, and monitoring it to determine if it comprises a valid Touch-Tone network control signal. This is accomplished by diode 140 passing the isolated excessive signal to a three-second integrator circuit which is comprised of resistors 141, 142, 143 and capacitor 144. The isolated excessive signal passed through this three-second integrator circuit is applied to the positive input terminal of threshold detector 147 whose other input terminal is connected to a voltage reference comprised of resistors 148 and 149. If the delayed excessive isolated signal exceeds this voltage reference, threshold detector 147 operates level shifting circuitry comprised of resistors 150, 151, 152, 154 and transistors 153, 155 to set the flip-flop comprised of operational amplifiers 156 and 157. Thus, if the excessive signal appearing on the communication path persists for longer than the three-second integration time interval, it is assumed that the signal does not comprise valid Touch-Tone network control signals. The presence of this long term excessive signal causes the aforementioned flip-flop to be set, which flip-flop drives light emitting diode 159 through resistor 158. The light output of light emitting diode 159 drives phototransistor 136 of gain control circuit 102. Phototransistor 136 shifts the voltage reference level applied by resistors 131, 132, 135, 137 to the positive input terminal of operational amplifier 130, thereby changing the threshold reference and thus the amount of resistance presented by variable resistor 122 to the signal. Thus, Touch-Tone detector 101 prevents excessive signals of duration less than three-seconds from being attenuated, assuming these signals to be valid Touch-Tone network control signals. If long term excessive signals are detected, variable resistor 122 is enabled to pass an additional amount of the isolated excessive signal to signal injection circuit 103 to thereby further selectively attenuate the excessive signal.

When the excessive signal is removed from the communication path T, R by communication circuit 199, the reduced signal from communication circuit 199 passes through diode 162 to a time delay circuit comprised of resistors 163, 164 and capacitor 165. The output of which time delay is applied to the positive input terminal of threshold detector 168 which compares this signal to a voltage reference as set by resistors 166 and 167 and applied to the negative input terminal of threshold detector 168. If the reduced signal is less than this voltage reference, threshold detector 168 resets the flip-flop comprised of operational amplifiers 156 and 157 by driving transistor 174 through capacitor 173. Threshold detector 168 also drives light emitting diode 170 through resistor 169. The light output of light emitting diode 170 activates photoDarlington 171 which activates transistor 145 through resistor 161 thereby discharging the aforementioned three-second integrator circuit, resetting Touch-Tone detector circuit 101 to its initial condition and thereby also resetting the threshold of gain control circuit 102.

While a specific embodiment of the invention has been disclosed, variations in procedural and structural detail, within the scope of the appended claims, are possible and are contemplated. There is no intention of limitation to what is contained in the abstract or the exact disclosure as herein presented. The above-described arrangements are only illustrative of the application of the principles of our invention. Normally, other arrangements may be devised by those skilled in the art without departing from the spirit and the scope of our invention.

We claim:

1. A selective signal limiting circuit for attenuating one ($2V_A$) of a plurality of signals appearing on a communication path (T, R) CHARACTERIZED IN THAT said signal limiting circuit comprises:

signal isolation means (100) for separating and inverting said one signal ($2V_A$) from said plurality of signals appearing on said communication path (T, R);

gain control means (102) for attenuating said separated inverted one signal ($-2V_A$);

signal injection means (103) for applying said attenuated separated inverted one signal to said communication path (T, R) to cancel a portion of said one signal ($2V_A$) appearing thereon;

means for detecting (104-4, 147-55) the presence of network control signals in said one signal ($2V_A$); and means responsive to said detection means (140-4, 147-55) for disabling (156-9) said gain control means (102) to prevent the attenuation of said network control signals.

2. The invention of claim 1 CHARACTERIZED IN THAT said signal limiting circuit additionally includes reset means (145-6, 160-175) for disabling said disabling means (156-9) upon the termination of said network control signals.

3. The invention of claim 1 CHARACTERIZED IN THAT said signal isolation means (100) includes:

summation means (110-117) for obtaining both the sum and the difference of the signals appearing on said communication path (T, R);

combination means (118-119) for combining said sum and said difference to isolate said one signal ($2V_A$); and inversion means (120, 121) for inverting said isolated one signal ($2V_A$).

4. In a communication system, wherein a first circuit (199) is connected to a second circuit by a communication path (T, R), a signal limiting circuit for selectively attenuating signals ($2V_A$) from said first circuit (199), when said first circuit signals ($2V_A$) exceed a predetermined threshold, CHARACTERIZED IN THAT said signal limiting circuit comprises:

signal isolation means (100) for separating and inverting said first circuit signals ($2V_A$) from signals from said second circuit ($2V_B$) appearing on said communication path (T, R);

comparison means (129-37) for generating an enable signal when said separated inverted first circuit signal ($-2V_A$) exceeds a predetermined threshold;

gain control means (122) responsive to said comparison means (129-37) enable signal for attenuating said separated inverted first circuit signal ($-2V_A$); and signal injection means (103) for applying said attenuated separated inverted first circuit signal to said communication path (T, R) to cancel a portion of said first circuit signal ($2V_A$) appearing thereon.

5. The invention of claim 4 CHARACTERIZED IN THAT said gain control means (122) is responsive to the absence of said comparison means (129-37) enable signal for blocking said separated inverted first circuit signal from said signal injection means (103).

6. The invention of claim 5 CHARACTERIZED IN THAT said signal limiting circuit additionally comprises:

means for detecting (140-4, 147-55) the presence of network control signals in said first circuit signals ($2V_A$);

reset means (145-6, 160-175) for resetting said detection means (140-4, 147-55) upon the termination of said network control signals in said first circuit signals ($2V_A$); and wherein said comparison means (129-37) is responsive to said detection means (140-4, 147-55) determining the presence of network control signals in said first circuit signals ($2V_A$) for removing said comparison means (129-37) enable signal, thereby blocking said separated inverted first circuit signal ($-2V_A$) from said signal injection means (103).

7. The invention of claim 4 CHARACTERIZED IN THAT said signal isolation means (100) includes:

summation means (110-117) for obtaining both the sum ($V_A+V_B$) and the difference ($V_A+V_B$) of said first circuit signals ($2V_A$) and said second circuit signals ($2V_B$) appearing on said communication path (T, R);

combining means (118-119) for combining said sum ($V_A+V_B$) and said difference ($V_A-V_B$) to isolate said first circuit signals ($2V_A$); and inversion means (120-1) for inverting said isolated first circuit signals ($2V_A$).

* * * * *